United States Patent Office 3,060,140
Patented Oct. 23, 1962

3,060,140
POLYGLYCIDYL ETHERS OF HYDROXYPHEN-
YLATED-PHENYLETHERATED POLYMERS
Sylvan Owen Greenlee, 343 Laurel Drive,
West Lafayette, Ind.
No Drawing. Filed Mar. 23, 1960, Ser. No. 16,918
13 Claims. (Cl. 260—23)

This invention relates to novel glycidyl ethers and to conversion products thereof. More particularly, the invention relates to glycidyl ethers of polymers and co-polymers of polybutadiene and its homologues and to conversion products of such ethers.

It is well known that the polymerization of active olefin compounds yields polymers characterized by many highly desirable physical properties. Such polymers accordingly have found application inter alia in rubber products, fabrics, adhesives, coatings and molded products. Most olefin polymers are however thermoplastic and demonstrate little or no chemical functionality effective in reaction with other materials, such as coupling agents for conversion to the thermoset state. A major exception is the vulcanization of butadiene type polymers to form cured synthetic rubber products. The vulcanization reaction entails cross-linking of the thermoplastic polymers through addition of sulfur and other reactants to the olefin double bonds present therein.

The high polymers of the butadiene type, known as rubber polymers, the styrene polymers, the vinyl chloride-vinyl acetate polymers and the acrylate polymers, are characterized by excellent flexibility and chemical resistance and hence are used ideally in the formulation of thermoplastic coatings. Such thermoplastic polymers have also found application in conjunction with thermosetting resins effective in providing an overall composition convertible to a relatively insoluble and infusible state. Many of the high polymers, particularly those of the rubber type, are used in the formulation of adhesives and insulating materials. Such products, however, are likewise either thermoplastic or comprise thermosetting mixtures of thermoplastic polymers with materials sensitive to further polymerization.

An additional category of materials used extensively in the formulation of coatings, adhesives and molding compositions comprises thermosetting condensates of aldehydes with phenols, melamine or urea, unsaturated vegetable oils and unsaturated oil-modified resins including alkyd resins and epoxy resin esters.

One of the weaknesses generally recognized in the use of thermoplastic materials for coatings and many other applications is sensitivity to strong organic solvents. Certain thermoplastic materials, however, demonstrate extreme resistance to water, to aqueous solutions of various chemicals, and to highly polar organic compounds such as the glycols and low molecular weight polyethers. In contrast, certain thermosetting materials including the epoxy resins, various alkyd resins and some formaldehyde condensates form coatings which are sensitive to various highly polar materials, such as aqueous systems, and polar organic solvents including glycols, ketones, esters and polyethers. For application of solvent solutions in coatings, adhesives and impregnants, thermoplastic butadiene and vinyl polymers demonstrate advantageous general solubility in hydrocarbon solvents whereas thermosetting materials, such as epoxy resins and formaldehyde condensates, require extremely strong polar solvents such as ketones and esters. Hydrocarbon solvents are more economical and less likely to dissolve primers, undercoats and old coatings to be re-coated, and hence are much preferred to the ketone and ester solvents particularly in the coating industry. Thermoplastic and thermosetting resinous materials each are characterized by desirable properties for specific applications. For many purposes, however, it would be desirable to thermoset butadiene and vinyl type polymers without sacrifice of the attendant excellent physical and chemical characteristics thereof. Butadiene and vinyl polymers modified to include a proper degree of chemical functionality could be reacted with cross-linking agents, with thermosetting resins, or self-polymerized and thereby converted into essentially thermoset materials.

It is, therefore, a principal object of this invention to provide modified butadiene type polymers which can be thermoset.

It is more specifically a primary object of the invention to provide modified butadiene type polymers which readily react with cross-linking agents as thermosetting resins, or which self-polymerize to form infusible, insoluble products.

It is an additional object of the invention to provide modified butadiene polymers which are readily soluble in commercially available hydrocarbon solvents and which may be thermoset by reaction with cross linking agents or polymerization catalysts.

An additional object of the invention is to provide infusible, insoluble plastic coatings and fabricated objects characterized by high resistance to water, alkali, acid and polar and nonpolar organic and inorganic solvents.

As utilized herein, the "butadiene" is embracive of butadiene and the homologues thereof, and the term "butadiene polymers" is inclusive of butadiene homopolymers and the co-polymers of butadiene with other monomers.

The invention generically contemplates the polyglycidyl ethers of hydroxyphenylated-phenyletherated polymers prepared by alkylating a phenol selected from a group consisting of monohydric and dihydric phenols having at least one unsubstituted ortho- or para-position on an aromatic nucleus to which a phenolic hydroxyl group is attached, with an unsaturated polymer selected from the group consisting of butadiene and its homologues and co-polymers of butadiene and its homologues with vinylly (i.e., 1,2-ethylenically) unsaturated polymers prior to reaction with the phenol having at least an average number of olefinic double bonds determined by the formula $$y = \frac{10}{2x-1}$$

where $y$ is the number of olefin double bonds in said unsaturated polymer and $x$ is equal to the functionality of said phenol; said hydroxyphenylated-phenyletherated polymer being soluble in aromatic hydrocarbon solvents and having a total phenol addition of at least about 10% by weight, a phenol addition as hydroxyphenol of at least 5% by weight, said phenol additions being expressed as equivalents of phenol at unit weight 94, an average of at least 2.5 phenolic hydroxyls per molecule and a Durran softening point of at least 50° C.

The hydroxyphenylated-phenyletherated polymers used in forming the polyglycidyl ethers of this invention and detailed methods for the preparation thereof are fully described in co-pending Greenlee applications Serial No. 833,144 and Serial No. 16,136, the pertinent disclosures of which are incorporated herein by reference. Such polymers and processes do not, per se, form a part of this invention and therefore will not be described in detail in this specification. In general, the contemplated hydroxyphenylated polymers are prepared by the alkylation of a monohydric or dihydric phenol in the presence of an alkylation catalyst such as boron trifluoride, aluminum phenoxide, aluminum chloride, iron chloride and antimony chloride with a butadiene polymer or co-polymer which is liquid at the reaction temperature or sufficiently soluble in organic solvents to permit the alkylation reaction to proceed. Representative butadiene polymers and co-polymers include:

(1) DPR (low viscosity) (DPR, Inc.)—a depolymerized natural rubber being composed of isoprene units and having a specific gravity of 0.92 at 25° C., a molecular weight of around 7,000 and a viscosity of around 11 poises as a 90% solution in toluene at 25° C.

(2) Neoprene FB (E. I. du Pont de Nemours and Company)—a soft, solid polymer of chloroprene soluble in hydrocarbon solvents and having a viscosity of around 6–7 poises as a 75% solution in toluene.

(3) Buton 100 (formerly known as C-Oil MD420) (Enjay Company, Inc.)—a co-polymer of butadiene and styrene having a molecular weight in the range of 8,000 to 10,000, an iodine value of approximately 300, and a composition of approximately 80 parts butadiene and 20 parts styrene. The butadiene content is described as composed of approximately 40% 1,4-addition and 60% 1,2-addition. Buton 100 has a specific gravity of 0.915 at 25° C. and a viscosity of around 10 poises as a 90% solution in toluene.

(4) Butarez (Phillips Petroleum Company)—liquid butadiene polymers composed of approximately 55–65% 1,2-addition units. These polymers contain on the average of 0.8 double bond per C4 unit giving iodine values of 375–400.

Butarez 5 has a viscosity of 36–37 poises at 25° C. and 5.5 poises as a 90% solution in toluene at 25° C.

Butarez W has a molecular weight of around 1,800, a viscosity of 98–100 poises at 25° C. and a viscosity of 12–13 poises as a 90% solution in toluene at 25° C.

(5) Pale Crepe Rubber (No. 1—Standard Quality Thick Pale Crepe as defined by the Rubber Manufacturers Association, Inc.)—a natural rubber having a typical average analysis of 2.88% acetone extract, 2.82% protein, 0.30% ash and 93.5% rubber hydrocarbon content.

(6) Naugapol 1022 (Naugatuck Chemical Division of United States Rubber Company)—a synthetic rubber co-polymer of butadiene and styrene.

(7) Isoprene Rubber (Shell Chemical Corporation)—a polyisoprene possessing physical properties which approximate those of natural Hevea rubber. Chemically it is a steriospecific cis-1,4-isoprene polymer of high purity.

(8) Hycar 1312 (B. F. Goodrich Chemical Company)—a nonrubber co-polymer of butadiene and acrylonitrile having a specific gravity of 0.97 at 25° C., a viscosity of 1,000 poises at 30° C., and 13 poises as a 90% solution in toluene at 25° C.

As indicated in the aforementioned copending applications, all monohydric and dihydric phenols which may be alkylated with the specified polymers are contemplated for the production of the hydroxyphenylated-phenyletherated polymers. The preferred phenols are phenol, the cresols, and resorcinol.

Representative and preferred hydroxyphenylated-phenyletherated polymers together with the general methods utilized for the preparation thereof are described in Table I.

The general procedure used in preparing the hydroxyphenylation products described in the table and using $BF_3$ catalyst is given as follows:

In a 5-liter, 3-neck flask provided with a thermometer, a mechanical agitator, a 1-liter dropping funnel, an electrical heating mantle and a pan of tap water to be used for cooling the reaction if necessary, is placed the phenol dissolved in the indicated solvent, and the $BF_3$ ether catalyst. The reaction mixture is raised to the indicated reaction temperature and addition of the polymer or co-polymer dissolved in the indicated solvent (or without solvent) begun. The addition is at such a rate that the temperature does not rise above the desired reaction temperature from exothermic heat. Addition is normally carried out over a period of 10–30 minutes, applying heat if necessary or cooling the flask externally with a pan of tap water if required to hold the reaction temperature. At the end of the reaction period the temperature is lowered to 90° C., in cases where the reaction temperature is above 90° C., and 1500 ml. hot tap water added. With continuous agitation the mixture is heated at 80° C., for 10–15 minutes and allowed to separate into water and organic layers. In case layering is not satisfactory because of emulsification, 20 to 50 ml. of acetic acid is added to the wash. The water layer is removed and the washing with 80° C. tap water repeated two more times. The flask is then provided with a salt-ice bath cooled receiver and the mixture heated with rapid agitation until the pot temperature reaches 150–160° C. at which point the pressure is reduced to 15–20 mm. of mercury by using a water pump. The batch is held about 15 minutes at this pressure keeping the pot temperature at 150–250° C. depending on the softening point of the final product (softening points as used throughout this description were determined by Durran's Mercury Method, Journal of Oil & Color Chemists' Association, 12, 173–175, 1929). In order to keep the hydroxyphenylated polymer sufficiently fluid for good agitation, the pot temperature at this stage is maintained at an estimated 50° C. above the softening point of the final product. The receiving flask is then connected to a vacuum pump and the pressure reduced to 1 to 5 mm. of mercury holding this pressure for 10–15 minutes while holding the pot temperature of the constantly agitated product at a temperature estimated to be 50° C. above the softening point. The product is poured into a suitable container and allowed to cool. The general procedure used in preparing the hydroxyphenylation products described in the table and using aluminum phenoxide catalyst differs from the above procedure for $BF_3$ preparation as follows:

The aluminum foil or turnings is dissolved in the phenol at a temperature of 150° C. or higher as necessary for the specific phenol after which the pot temperature is adjusted to the specified reaction temperature. With all washed batches sufficient acid is added to convert the aluminum to a water soluble salt. The tabulated hydroxyl values were determined by reaction with excess acetyl chloride followed by titration with alkali as described more completely in my copending application S.N. 833,144.

TABLE I

*Hydroxyphenylated Butadiene Polymers*

| Ex. No. | Grams Phenol and ml. solvent | Grams butadiene polymer and ml. solvent | Catalyst | Hours at ° C. | Grams product | Percent weight as OH | Softening point, ° C. |
|---|---|---|---|---|---|---|---|
| 1 | 564 phenol, 525 xylene | 439 Butarez 5, 525 xylene | 45 ml. $BF_3$·ether | 2.5 at 100 | 615 | 3.46 | 142 |
| 2 | 564 phenol | 439 Butarez 5, 225 xylene | 3 g. Al foil | 1 at 175 | 543 | 1.26 | 54 |
| 3 | ------do------ | 439 Buton 100, 412 aromatic solvent, B.P. 171–278° C. | 4.5 g. Al foil | 1.5 at 175 | 543 | 1.25 | 111 |
| 4 | 564 phenol, 525 aromatic solvent, B.P. 171–278° C. | 439 Buton 100, 525 aromatic solvent, B.P. 171–278° C. | 10 ml. $BF_3$·ether | 1.25 at 155–159 | 562 | 1.94 | 167 |
| 5 | 440 resorcinol, 525 xylene | 439 Butarez 5, 525 xylene | ------do------ | 1.5 at 100–105 | 620 | 8.90 | 88 |
| 6 | 2,000 o-cresol | 500 Butarez 5 | 10 g. Al foil | 3 at 190–195 | 833 | 5.38 | 112 |
| 7 | 2,000 phenol, 500 xylene | 250 Buton 100, 200 xylene | 15 ml. $BF_3$·ether | 2.5 at 100–105 | 349 | 4.17 | 140 |
| 8 | 1,500 o-cresol | 375 Buton 100 | 4 g. Al foil | 3 at 190–195 | 624 | 3.73 | 147 |

The polyglycidyl ethers of the invention are prepared by reacting the hydroxyphenylated-phenyletherated polymers with a halohydrin selected from the group consisting of epichlorhydrin, epibromohydrin, glycerol dichlorohydrin and glycerol dibromohydrin in the manner well known to the art for the production of glycidyl ethers as described, for example, in U.S. Patents 2,801,227 and 2,467,171. In general, the polyglycidyl ethers of the invention may appropriately be prepared by the addition of hydroxyphenylated-phenyletherated polymers to the halohydrin utilized in an excess of greater than one mol of halohydring per equivalent weight of phenolic hydroxyl group present in the polymer reactant and thereafter adding an alkali metal hydroxide such as sodium or potassium hydroxide to the mixture to effect the desired etherification reaction. It is convenient to dissolve the hydroxyphenylated-phenyletherated polymer in the stoichiometric excess of halohydrin, and to utilize a supplemental solvent, such as xylene or toluene if necessary, to afford the proper viscosity in the reaction mixture. The mixture of polymer and halohydrin is preferably heated to a temperature in the range of about 100–120° C. Aqueous alkaili metal hydroxide of a concentration of about 15–50% by weight is thereafter gradually added to the reaction mixture. At temperatures in excess of 100° C. the water added with the hydroxide and formed in the reaction is removed by distillation azeotropically with halohydrin. The condensed azeotrope separates into an aqueous phase and the halohydrin or halohydrin-organic phase is returned to the reaction mixture.

The alkali metal hydroxide, preferably sodium, potassium or lithium hydroxide is utilized in an amount preferably to about 0.1 to about 5% in excess of the stoichiometric quantity of phenolic hydroxyl group present. Alternatively, the alkali metal hydroxide may be added as an alcohol solution. Alkoxides, specifically sodium and potassium alkoxides, may be utilized in lieu of the corresponding hydroxides.

On completion of the etherification reaction, unreacted halohydrin and any solvent present may appropriately be removed by distillation or by other means familiar to the art. The residue of the reaction mixture will consist primarily of the desired polyglycidyl ether of the hydroxyphenylated-phenyletherated polymer and alkali halide and is appropriately treated with a solvent such as xylene or toluene to dissolve the polyglycidyl composition. The salt is thereafter removed by filtration and the filtrate stripped of volatile materials under reduced pressure to provide the desired polyglycidyl composition.

Representative examples of polyglycidyl ethers of hydroxyphenylated-phenyletherated polymers contemplated by the invention together with ractants and reaction conditions utilized are reported in Table II entitled "Glycidyl Ethers of Hydroxyphenylated-Phenyletherated Butadiene Polymers." The general procedure utilized in production of the polyglycidyl ethers reported in Table II was as follows:

The indicated hydroxyphenylated-phenyletherated butadiene polymer, halohydring, and solvent were combined in a 3-neck flask fitted with a stirrer, condenser, two dropping funnels and a thermometer. The condenser was attached to the flask through a water leg (Dean-Stark) to effect removal of water from the system. Heat was applied to effect solution of the polymer in the halohydrin. Agitation was initiated as soon as sufficient homogeneity of the polymer and halohydrin was obtained. The reaction temperature was adjusted to the indicated range. A 40% aqueous solution of sodium hydroxide in an amount equivalent to provide 1.01 mols of sodium hydroxide per equivalent of phenolic hydroxyl group was added drop-wise with continuous agitation. The water layer formed in the water leg is discarded and the separated halohydrin is returned to the reaction mixture.

The rate of addition of sodium hydroxide was adjusted to preclude the exothermic reaction from reaching a temperature in excess of that indicated in Table II. Sodium hydroxide addition normally required a period from about 1.5 to about 1.75 hours. Upon completion of the sodium hydroxide addition, heating of the reaction mixture was continued for the remainder of the reaction time indicated in Table II.

Thereafter the condenser was adjusted for distillation and heating, and the reaction mixture was heated and stirred until the temperature reached about 150° C., at which time the pressure was gradually reduced to about 15–20 mm. of mercury by water pump, thereafter permitting the temperature to reach a maximum of 160° C. At this point the reaction mixture was allowed to cool to about 120° C. and treated with xylene in an amount corresponding to about 2 to 3 times the weight of the polymer utilized. After thorough agitation, the reaction mixture was filtered to remove the insoluble sodium chloride. The separated sodium chloride was washed with solvent, and the washings were combined with the glycidyl ether solution. The glycidyl ether solution was then gradually heated to a temperature of about 150° C. under a vacuum of about 15–20 mm. mercury, which was ultimately reduced to 3–5 mm. of mercury, permitting the temperature to reach a maximum of about 160–190° C. requisite to maintain the polyglycidyl ether sufficiently fluid for continuous agitation. The hot, liquid polyglycidyl ether product was then poured from the flask into a cooling pan.

Epoxide contents of the polyglycidyl ethers were measured by heating samples which corresponded to approximately one gram sample per each 400 in equivalent weight with an excess of pyridine containing pyridine hydrochloride (made by adding 16 ml. of concentrated hydrochloric acid per liter pyridine) at the boiling point for 20 minutes and back-titrating the excess pyridine hydrochloride with .1 N KOH using phenolphthalein as indicator and considering that 1 mol of the HCl is equivalent to one epoxide group.

Although molecular weights are not available to relate the epoxide equivalent weights to the molecular weights of the hydroxyphenylated polymers, it will be recognized that the glycidyl ethers are polyepoxides.

Generally, the polyglycidyl ethers contemplated by this invention will be characterized by at least about 2 epoxide groups per molecule and preferred ethers will be characterized by at least about 4 epoxide groups per molecule. The number of epoxide groups per molecule may vary widely depending upon the particular application. It will be recognized that, as the molecular weight of the polymer increases, it is desirable to increase the number of epoxy groups per molecule.

TABLE II

*Glycidyl Ethers of Hydroxyphenylated-Phenyletherated Butadiene Polymers*

| Ex. No. | Grams of hydroxyphenyl polymer | Grams epichlorohydrin and solvent | Reaction time in hours | Reaction temperature in ° C. | Softening point | Epoxide equiv. weight |
|---|---|---|---|---|---|---|
| 1a | 490 of Example 1 | 385 and 175 ml. xylene | 2.25 | 102–108 | 137 | 905 |
| 2a | 450 of Example 2 | 92.5 | 2.00 | 109–120 | 54 | 3,259 |
| 3a | 534 of Example 3 | 231 and 175 ml. xylene | 2.25 | 105–115 | 120 | 2,033 |
| 4a | 365 of Example 4 | 231 and 100 ml. xylene | 2.00 | 103–112 | 155 | 1,942 |
| 5a | 382 of Example 5 | 925 | 2.25 | 101–108 | 66 | 516 |
| 6a | 158 of Example 6 | 231 and no solvent | 2.00 | 108–119 | 105 | 747 |
| 7a | 204 of Example 7 | do | 2.00 | 108–118 | 165 | 885 |
| 8a | 228 of Example 8 | do | 2.20 | 105–119 | 145 | 1,105 |

To illustrate, the basic co-polymer of butadiene and styrene referred to as Buton 100 has a molecular weight in the range of 8,000–10,000. By hydroxyphenylation, the weight of Buton 100 increased by approximately 20% due to the added weight of hydroxyphenyl and phenyl ether groups. There also appears to be an increase in molecular weight of the hydroxyphenylated butadiene polymers due to side reactions such as further polymerization through the olefin double bonds and dialkylation. The molecular weight of the hydroxyphenylated Buton 100 used in preparing the polyglycidyl ethers of Examples 3a, 4a, 7a, and 8a would, then, be at least 10,000 and probably higher.

The glycidyl ether group is known to the art to be exceeding reactive. As a functional group of the hydroxyphenylated polymers contemplated by this invention, the glycidyl ether group is effective for conversion of such polymers into thermosetting materials with any of the various converting agents known to be useful for the conversion of polyepoxides. The invention accordingly embraces generically all epoxide-converting agents, including specifically but without limitation such converting agents as primary and secondary polyamines, organic polybasic acids and their anhydrides, formaldehyde condensates of phenols and urea or melamine derivatives, tertiary amines, polyamides, polymercaptans, polyhydric phenols, Lewis acids including $BF_3$ and the mineral acids, alkali phenoxides and polyhydrazides. More particularly, the glycidyl ethers of the invention may be converted to thermosetting materials by all of the various active hydrogen containing compounds and by catalysts effective to polymerize epoxide groups.

A preferred group of coupling agents comprises the amino amides which are the reaction products of polyalkylene polyamines and dimerized vegetable oil acids. Such products are sold by the General Mills Company under the trade name "Versamids." Similar valuable converting agents result from reaction of the polyalkylene polyamines in stoichiometric excess with the monomeric vegetable oil acids.

A particularly advantageous modification of the glycidyl ether conversion systems contemplated by the invention embraces mixtures thereof with coal tars and asphalts which, upon conversion, yield materials useful as underground pipe coatings and in road building. The unique solubility of the new glycidyl ethers in hydrocarbons as compared to the solvency requirements of ketone and ester solvents for commercially known polyepoxide resins makes them very advantageous in formulation in mixtures with these cheap hydrocarbon coal tar and asphalt materials. Small portions as low as 5 to 10 percent of the total formulation weight as coal tar or asphalt contributes to the flexibility of the converted system. Conversely, incorporation of as low as 5 to 10 percent of the total formulation weight as the new glycidyl ether with a converting agent gives appreciable elevation of the softening point of the coal tar and asphalt materials. Compositions containing from 10 to 90 percent of the total weight as coal tar or asphalt are particularly advantageous. U.S. Patent 2,765,288 describes the formulation of certain coatings based on mixtures of one class of commercial polyepoxides with coal tar pitch. U.S. Patent 2,906,720 describes the formulation of similar coatings based on commercial polyepoxides and high aromatic content petroleum asphalt. The solubility in hydrocarbons of the polyglycidyl ethers of this invention is such that the use thereof to modify coal tar and asphalt compositions applies to the complete range of low and high aromatic content pitches. The epoxide conversion systems based on the new glycidyl ethers demonstrate a marked effect of hardening and insolubilizing of tars and asphalts and yield products superior to the analogous products known to the prior art.

Examples 1b through 8c illustrate the capacity of the glycidyl ethers described in Examples 1a through 8a to thermoset to form infusible, insoluble protective coatings. Viscosities represented by the examples were determined by a Gardner bubble viscometer. Film hardness was measured with a Sward rocker with the value for a flat glass plate set at 100. GL hardness-adhesion readings are reported as the number of grams weight required to scratch the surface in one case and to completely remove the film from the panel in the other case as determined from a Graham-Linton hardness tester. The bend tests were run using a mandrel set manufactured by the Gardner Laboratory, Inc. Wet films .003" thick were spread on 30 gauge, bright, dry finish coke 3" x 5" tin plates cured by baking as indicated in the examples and bent sharply around a steel rod of the size indicated in the examples.

EXAMPLE 1b

A mixture of two parts of the polyepoxide of Example 1a and 1 part of Versamid 115 diluted to 50% non-volatile content in xylene gave a viscosity of R to S. A wet film of 0.003 inch thickness on a glass plate baked for 10 minutes at 150° C. gave a rocker hardness value of 36, a GL film scratch value of 700 and a GL film removal to the glass surface value of 900. A similarly baked film applied to tin plate passed a bend test of ⅛ inch. The baked film on glass plate was unaffected by one week exposure at 25° C. to 10% aqueous sodium hydroxide, 50% aqueous sulfuric acid, or 30% aqueous ammonia. Versamid 115 is an amino-amide prepared by the reaction of a polyethylene polyamine with dimerized vegetable oil acids to give a viscosity of 500–750 poises at 40° C., an amine value of 210–230 and available from the Chemical Division of General Mills, Inc.

EXAMPLE 2b

A mixture of 2 parts of the polyepoxide of Example 2a and 1 part of Versamid 115 dissolved in xylene to a non-volatile content of 50% gave a viscosity of E. A film on glass plate of 0.003 inch wet thickness heated for 30 minutes at 150° C. gave an infusible, insoluble product having a rocker hardness value of 30 and good flexibility as shown by its passing a ¼ inch bend test.

EXAMPLE 3b (1) A mixture of 100 parts of the polyglycidyl ether of Example 3a and 1 part DMP 30 [tris (dimethylaminomethyl) phenol] dissolved in xylene to 40% non-volatile content gave a color of 8 (Gardner-Hellige), and a viscosity of R. A film of 0.003 inch wet thickness baked for 15 minutes at 175° C. gave a rocker hardness of 44, a GL surface scratch of 300 and a GL film removal from glass plate of 1000. Such films withstood two weeks exposure at 25° C. to 10% aqueous sodium hydroxide, 30% aqueous ammonia, and glacial acetic acid.

(2) A mixture of 4 parts of the polyglycidyl ether of Example 3a and 1 part of Versamid 115 was dissolved in xylene to 40% non-volatile content to give a varnish having a color of 9 and a viscosity of Z2. A film of 0.003 inch wet thickness when baked for .5 hour at 100° C. gave a rocker hardness value of 50, a GL surface scratch value of 400, a GL film removal value of 900 and a bend test of ⅜ inch. Such films withstood 10% aqueous sodium hydroxide and 30% ammonia for a period of 24 hours and glacial acetic acid for a period of two hours. Films of the same material baked for 15 minutes at 200° C. withstood 10% aqueous sodium hydroxide, 30% aqueous ammonia, and glacial acetic acid for a period of two weeks without indication of any deterioration.

(3) A mixture of 50 parts of the polyglycidyl ether of Example 3a and 50 parts of the hydroxyphenylated butadiene polymer of Example 3 was dissolved in xylene to give a non-volatile content of 40%, a color of 9, an original viscosity of K and a viscosity of V after one day. Films of 0.003 inch wet thickness baked for .5 hour at 150° C. gave a rocker hardness value of 50, a GL surface scratch of 300, a GL film removal value of 1000 and a bend test of 1 inch. Such films on glass withstood 10% aqueous sodium hydroxide, 30% aqueous ammonia and glacial acetic acid for a period of two weeks at 25° C.

EXAMPLE 4b

A mixture of 4 parts of the polyglycidyl ether of Example 4a and 1 part of Versamid 115 was dissolved in xylene to 40% non-volatile content to give a viscosity of Y. Films of 0.003 inch wet thickness when baked for 15 minutes at 175° C. gave a rocker hardness of 50 and a bend test of ¼ inch. Such films withstood 10% aqueous sodium hydroxide, 30% aqueous ammonia and glacial acetic acid for a period of two weeks at 25° C.

EXAMPLE 5b

A mixture of 26 parts of the polyglycidyl ether of Example 5a and 1.5 parts of diethylenetriamine were dissolved in xylene to a non-volatile content of 50% to give a viscosity of D-E. A film of 0.003 inch wet thickness baked for 10 minutes at 150° C. gave a rocker hardness of 30 and a bend test value of ⅛ inch. The same films when allowed to stand for 24 hours at room temperature gave a hard product which retained its flexibility.

EXAMPLE 6b

A mixture of 75 parts of the polyglycidyl ether of Example 6a and 20 parts of Versamid 115 were dissolved in xylene to a non-volatile content of 50% to give a viscosity of K. A film of 0.003 inch wet thickness was "force dried" by heating for 4 hours at 60° C. to give a hard, flexible film.

EXAMPLE 7b

A mixture of 88 parts of the polyglycidyl ether of Example 7a and 30 parts of trimerized soy bean oil acids was heated and mixed in a metal container and then heated in an oven for 3 hours at 150° C. to give a hard, infusible, molded object.

EXAMPLE 8b

A mixture of 110 parts of the polyglycidyl ether of Example 8a and 200 parts of Versamid 115 were dissolved in xylene to 50% non-volatile to give a viscosity of S. A film of 0.003 inch wet thickness baked for 20 minutes at 100° C. gave a rocker hardness of 48 and a bend test of ¼ inch.

EXAMPLE 8c

A mixture of 110 parts of the polyglycidyl ether of Example 8a, 200 parts of Versamid 115 and 103 parts of asphalt cement (120/150 penetration asphalt obtained from Socony Mobile Oil Company) were dissolved in xylene to 50% non-volatile to give a viscosity of M. A film of 0.003 inch wet thickness was heated for 6 hours at 50° C. to give a rocker hardness of 30, a bend test value of ⅛ inch and showed no indication of deterioration on exposure to 10% aqueous NaOH for two weeks.

I claim:

1. A compound containing at least two glycidyl ether radicals attached to a hydroxyphenylated-phenyletherated polymer through the phenolic hydroxyl groups of said polymer, said glycidyl radicals consisting of the residue of a halohydrin selected from the group consisting of epichlorohydrin, epibromohydrin, glycerol dichlorohydrin and glycerol dibromohydrin after the removal of at least one halogen atom therefrom, said hydroxyphenylated-phenyletherated polymer (1) being formed by the linkage of a phenol being free from radicals other than hydroxyl radicals and having less than 13 nuclear carbon atoms and at least one of the ortho and para-position carbon atoms in the nucleus thereof unsubstituted into and throughout the chain of an ethylenically unsaturated polymeric material at the sites of the double bonds of said unsaturated polymeric material, about 50% of said linkages being through etheral oxygen atoms provided by the hydroxyl groups of said phenol and about 50% of said linkages being through carbon-to-carbon saturated bonds between said polymer chain and the nucleus of said phenol at said ortho and para-positions, and (2) being characterized by solubility in aromatic hydrocarbon solvents, a total phenol content by addition linkage of at least about 10% by weight, an average of at least 2.5 phenolic hydroxyl groups per molecule of said hydroxyphenylated-phenyletherated polymer and a Durran softening point of at least 50° C., and said ethylenically unsaturated polymeric material (a) being selected from the group consisting of homopolymers of diene monomers selected from the group consisting of butadiene, isoprene, chloroprene, piperyline and 2,3-dimethyl butadiene, copolymers of said diene monomers with each other, and copolymers of said diene monomers with vinyl monomeric compounds having a single vinyl radical therein, and (b) having at least an average of olefinic double bonds per molecule determined by the formula $$y = 10/2x - 1$$

where $y$ equals the number of double bonds and $x$ equals the number of phenolic hydroxyl groups per molecule of said phenol to be addition linked thereto.

2. The compound according to claim 1 wherein said ethylenically unsaturated polymeric material is polybutadiene.

3. The compound according to claim 1 wherein said ethylenically unsaturated polymeric material is a copolymer of butadiene and a vinyl monomeric compound having a single vinyl radical therein.

4. A curable mixture which comprises (A) an epoxide converting agent having a plurality of active hydrogen-containing radicals therein selected from the group consisting of amino, carboxy, amido, mercapto, and hydroxyl radicals and (B) a compound containing at least two glycidyl ether radicals attached to a hydroxyphenylated-phenyletherated polymer through the phenolic hydroxyl groups of said polymer, said glycidyl radicals consisting of the residue of a halohydrin selected from the group consisting of epichlorohydrin, epibromohydrin, glycerol dichlorohydrin and glycerol dibromohydrin after the removal of at least one halogen atom therefrom, said hydroxyphenylated-phenyletherated polymer (1) being formed by the linkage of a phenol being free from radicals other than hydroxyl radicals and having less than 13 nuclear carbon atoms and at least one of the ortho and para-position carbon atoms in the nucleus thereof unsubstituted into and throughout the chain of an ethylenically unsaturated polymeric material at the sites of the double bonds of said unsaturated polymeric material, about 50% of said linkages being through ethereal oxygen atoms provided by the hydroxyl groups of said phenol and about 50% of said linkages being through carbon-to-carbon saturated bonds between said polymer chain and the nucleus of said phenol at said ortho and para-positions and (2) being characterized by solubility in aromatic hydrocarbon solvents, a total phenol content by addition linkage of at least about 10% by weight, an average of at least 2.5 phenolic hydroxyl groups per molecule of said hydroxyphenylated-phenyletherated polymer and a Durran softening point of at least 50° C., and said ethylenically unsaturated polymeric material (a) being selected from the group consisting of homopolymers of diene monomers selected from the group consisting of butadiene, isoprene, chloroprene, piperyline and 2,3-dimethyl butadiene, copolymers of said diene monomers with each other, and copolymers of said diene monomers with vinyl monomeric compounds having a single vinyl radical therein, and (b) having at least an average of olefinic double bonds per molecule determined by the formula $y = 10/2x - 1$, where $y$ equals the number of double bonds and $x$ equals the number of phenolic hydroxyl groups per molecule of said phenol to be addition linked thereto.

5. The curable mixture according to claim 4 wherein said unsaturated polymeric material is polybutadiene.

6. The curable mixture according to claim 4 wherein the unsaturated polymeric material is a copolymer of butadiene and a vinyl monomeric compound having a single vinyl radical therein.

7. The curable mixture according to claim 4 wherein said converting agent is an amino-amide condensation product of a polyalkylene polyamine and a dimerized vegetable oil acid.

8. The curable mixture according to claim 4 also containing hydrocarbon materials selected from the group consisting of coal tars, asphalts and mixtures thereof, said curable mixture containing from about 5 to about 95% based on the total weight of the mixture of said hydrocarbon material.

9. An infusible thermoset substance having a rocker hardness of at least 30 prepared by heating at a temperature of at least 50° C. for a time period requisite to provide said hardness a mixture comprising (A) an epoxide converting agent containing a plurality of active hydrogen-containing radicals therein selected from the group consisting of amino, carboxy, amido, mercapto and hydroxyl radicals, and (B) a compound containing at least two glycidyl ether radicals attached to a hydroxy-phenylated-phenyletherated polymer through the phenolic hydroxyl groups of said polymer, said glycidyl radicals consisting of the residue of a halohydrin selected from the group consisting of epichlorohydrin, epibromohydrin, glycerol dichlorohydrin and glycerol dibromohydrin after the removal of at least one halogen atom therefrom, said hydroxy-phenylated-phenyletherated polymer (1) being formed by the linkage of a phenol being free from radicals other than hydroxyl radicals and having less than 13 nuclear carbon atoms and at least one of the ortho and para-position carbon atoms in the nucleus thereof unsubstituted into and throughout the chain of an ethylenically unsaturated polymeric material at the sites of the double bonds of said unsaturated polymeric material, about 50% of said linkages being through ethereal oxygen atoms provided by the hydroxyl groups of said phenol and about 50% of said linkages being through carbon-to-carbon saturated bonds between said polymer chain and the nucleus of said phenol at said ortho and para-positions, and (2) being characterized by solubility in aromatic hydrocarbon solvents, a total phenol content by addition linkage of at least about 10% by weight, an average of at least 2.5 phenolic hydroxyl groups per molecule of said hydroxy-phenylated-phenyletherated polymer and a Durran softening point of at least 50° C., and said ethylenically unsaturated polymeric material (a) being selected from the group consisting of homopolymers of diene monomers selected from the group consisting of butadiene, isoprene, chloroprene, piperyline and 2,3-dimethyl butadiene, copolymers of said diene monomers with each other, and copolymers of said diene monomers with vinyl monomeric compounds having a single vinyl radical therein, and (b) having at least an average of olefinic double bonds per molecule determined by the formula $y = 10/2x - 1$, where $y$ equals the number of double bonds and $x$ equals the number of phenolic hydroxyl groups per molecule of said phenol to be addition linked thereto.

10. The infusible thermoset substance according to claim 9 wherein said unsaturated polymeric material is polybutadiene.

11. The infusible thermoset substance according to claim 9 wherein said unsaturated polymeric material is a copolymer of butadiene and a vinyl monomeric compound having a single vinyl radical therein.

12. The infusible thermoset substance according to claim 9 wherein said converting agent is an amino-amide condensation product of a polyalkylene polyamine and a dimerized vegetable oil acid.

13. The infusible thermoset substance according to claim 9 wherein said mixture also contains hydrocarbon materials selected from the group consisting of coal tars, asphalts and mixtures thereof, said mixture containing from about 5 to about 95% based on the total weight of the mixture of said hydrocarbon material.

References Cited in the file of this patent

UNITED STATES PATENTS

| | | |
|---|---|---|
| 2,456,408 | Greenlee | Dec. 14, 1948 |
| 2,765,288 | Whittier et al. | Oct. 2, 1956 |
| 2,801,227 | Goppel | July 30, 1957 |
| 2,906,720 | Simpson | Sept. 29, 1959 |
| 2,990,383 | Glasser | June 27, 1961 |